United States Patent
Selvig et al.

(10) Patent No.: US 9,085,314 B2
(45) Date of Patent: Jul. 21, 2015

(54) STOCKING CART CONVEYANCE

(75) Inventors: Erich Selvig, Eden Prairie, MN (US);
Chris Johnson, Glen Allen, VA (US)

(73) Assignee: TARGET BRANDS, INC., Minneapolis, MN (US)

( * ) Notice: Subject to any disclaimer, the term of this patent is extended or adjusted under 35 U.S.C. 154(b) by 1208 days.

(21) Appl. No.: 12/141,043

(22) Filed: Jun. 17, 2008
(Under 37 CFR 1.47)

(65) Prior Publication Data
US 2009/0309322 A1    Dec. 17, 2009

(51) Int. Cl.
*B62D 39/00* (2006.01)
*B62B 3/18* (2006.01)
*B62B 3/14* (2006.01)

(52) U.S. Cl.
CPC . *B62B 3/182* (2013.01); *B62B 3/14* (2013.01); *B62B 3/1476* (2013.01)

(58) Field of Classification Search
USPC ........................................ 280/33.991–33.998
See application file for complete search history.

(56) References Cited

U.S. PATENT DOCUMENTS

| | | | |
|---|---|---|---|
| 3,039,564 A | | 6/1962 | Shaukis |
| 3,083,791 A | * | 4/1963 | Shoffner .......................... 186/65 |
| 3,118,553 A | * | 1/1964 | Rosenzweig .................. 414/469 |
| 4,850,604 A | * | 7/1989 | Le Marchand et al. .. 280/33.996 |
| 5,507,507 A | | 4/1996 | Davidson |
| 6,644,674 B2 | | 11/2003 | Simard |
| D577,172 S | | 9/2008 | Coderre |
| D583,523 S | | 12/2008 | Deal et al. |
| 7,681,891 B2 | * | 3/2010 | Deal et al. ................ 280/33.991 |
| 2003/0151219 A1 | | 8/2003 | Simard |

* cited by examiner

*Primary Examiner* — J. Allen Shriver, II
*Assistant Examiner* — Erez Gurari
(74) *Attorney, Agent, or Firm* — Nixon & Vanderhye P.C.

(57) ABSTRACT

A stocking cart conveyance may include three tiers, wherein the lower and middle tiers are substantially full length and the upper tier is substantially shorter to improve user sight lines, cart maneuverability, and/or accessibility to items in the middle tier. The upper tier in illustrative embodiments may be approximately 70-80% of the length of the full length tier(s) so as to maintain significant storage volume while still providing improved access, maneuverability, or sight lines. The upper tier may optionally be hinged so as to further improve user accessibility to items placed on the second tier. In illustrative embodiments the carts may longitudinally nest into one another to reduce the space needed to store the carts, and in certain embodiments the carts may be configured to nest when the upper tiers are in an upright position.

16 Claims, 6 Drawing Sheets ated to U.S. Design application Ser. No. 29/319,940 filed on even date herewith, entitled "Cart," by Eric Selvig and Chris Johnson.

STOCKING CART CONVEYANCE

CROSS-REFERENCE TO RELATED APPLICATIONS

This application relates to U.S. Design application Ser. No. 29/319,940 filed on even date herewith, entitled "Cart," by Eric Selvig and Chris Johnson.

BACKGROUND

Department stores often store merchandise in stockrooms adjacent to a retail sales floor. The stockroom serves as a waiting area for goods that will be sent to the sales floor. For example, stockrooms usually include a loading area where store employees unload large pallets of boxed merchandise before moving the merchandise to the stockroom floor. The employees temporarily place the merchandise on shelves in the storeroom until the store employees are instructed to move the merchandise to the sales floor.

Many stockrooms are designed to accommodate both large pallets of merchandise and loose goods, i.e., goods not in boxes. The aisles separating stockroom shelving units are generally wide enough to allow merchandise pallets to fit in the aisles, while the height of the shelving units allow numerous pallets to be placed on each shelf. For example, each aisle may be approximately 3 feet wide flanked on either side by shelving units approximately 12 feet tall.

Store employees retrieve items placed on the stockroom shelves using a variety of tools. For example, employees often use ladders to reach goods placed on the upper portion of a shelf. Once the items have been placed on the floor, employees may prepare the goods to be transported to the sales floor. For example, the employees may unpack large merchandise pallets and remove the individual boxed goods that they will later transport to the stockroom floor.

Store employees generally transport the items to the sales floor by first transporting the selected items to the end of the aisle and placing them in a large wheeled tub. The tubs are generally square and about three feet tall; however, they generally are too wide to be moved down the aisles described above. Employees usually carry the items to tubs by hand or bring them to the tubs in the type of shopping cart typically found in a grocery store. After the items have been loaded into the tub, the employees may move the items to the sales floor using the tub.

SUMMARY

A stocking cart conveyance may include three tiers, wherein the lower and middle tiers are substantially full length and the upper tier is substantially shorter to improve user sight lines, cart maneuverability, and/or accessibility to items in the middle tier. The upper tier in illustrative embodiments may be approximately 70-80% of the length of the full length tier(s) so as to maintain significant storage volume while still providing improved access, maneuverability, or sight lines. The upper tier may optionally be hinged so as to further improve user accessibility to items placed on the second tier. In illustrative embodiments the carts may longitudinally nest into one another to reduce the space needed to store the carts, and in certain embodiments the carts may be configured to nest when the upper tiers are in an upright position. In illustrative embodiments, the overall cart length and height may be around forty inches and fifty inches, respectively, so as to enhance maneuverability of the cart and user accessibility to the items stored on each tier.

Details of one or more preferred embodiments are set forth in the accompanying drawings and the description below. Other features, objects, and advantages of the depicted embodiments will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
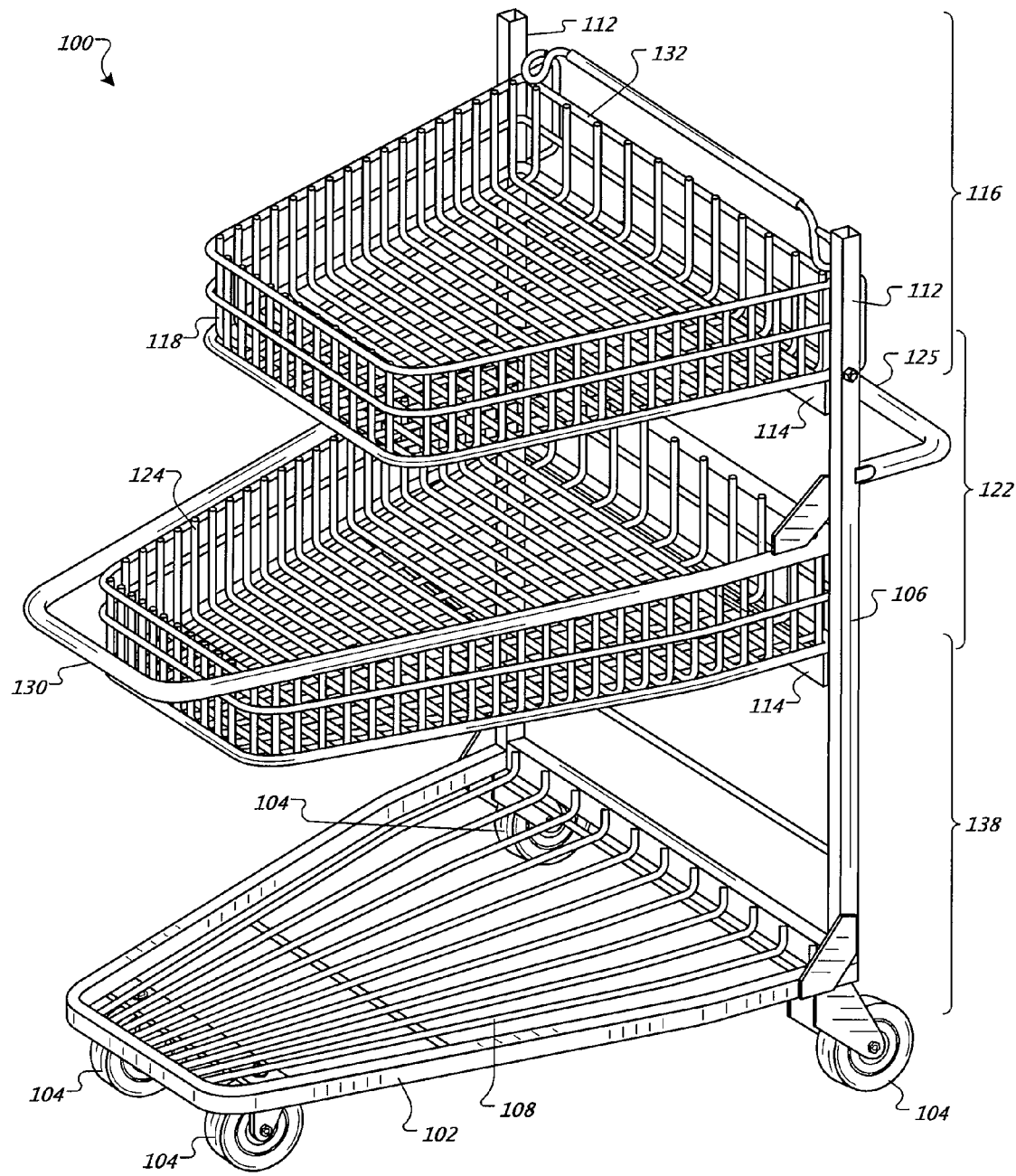
FIG. 1 is a perspective view of an embodiment of a stocking cart apparatus.
Figure 2:
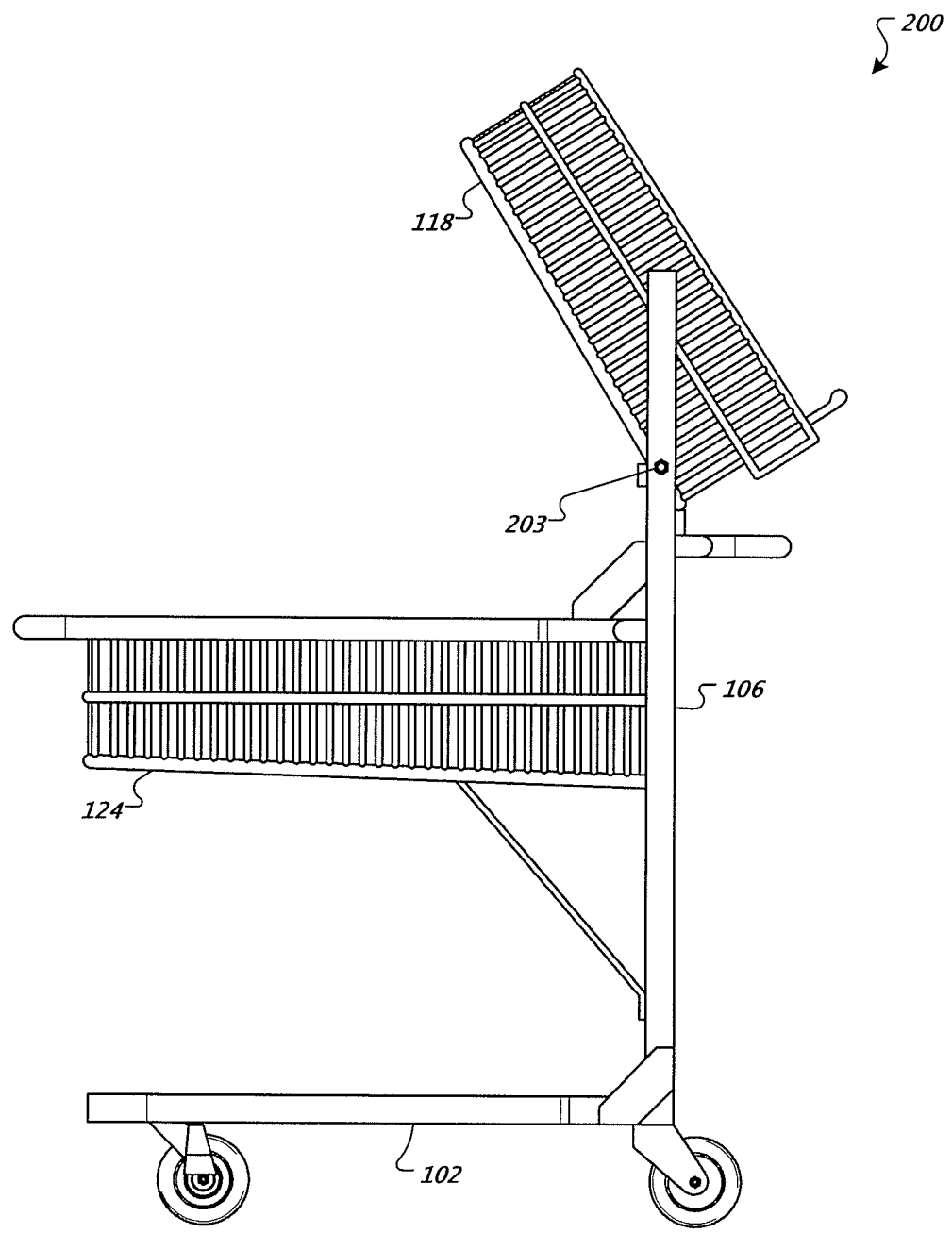
FIG. 2 is a side view of the stocking cart apparatus of FIG. 1.
Figure 3:
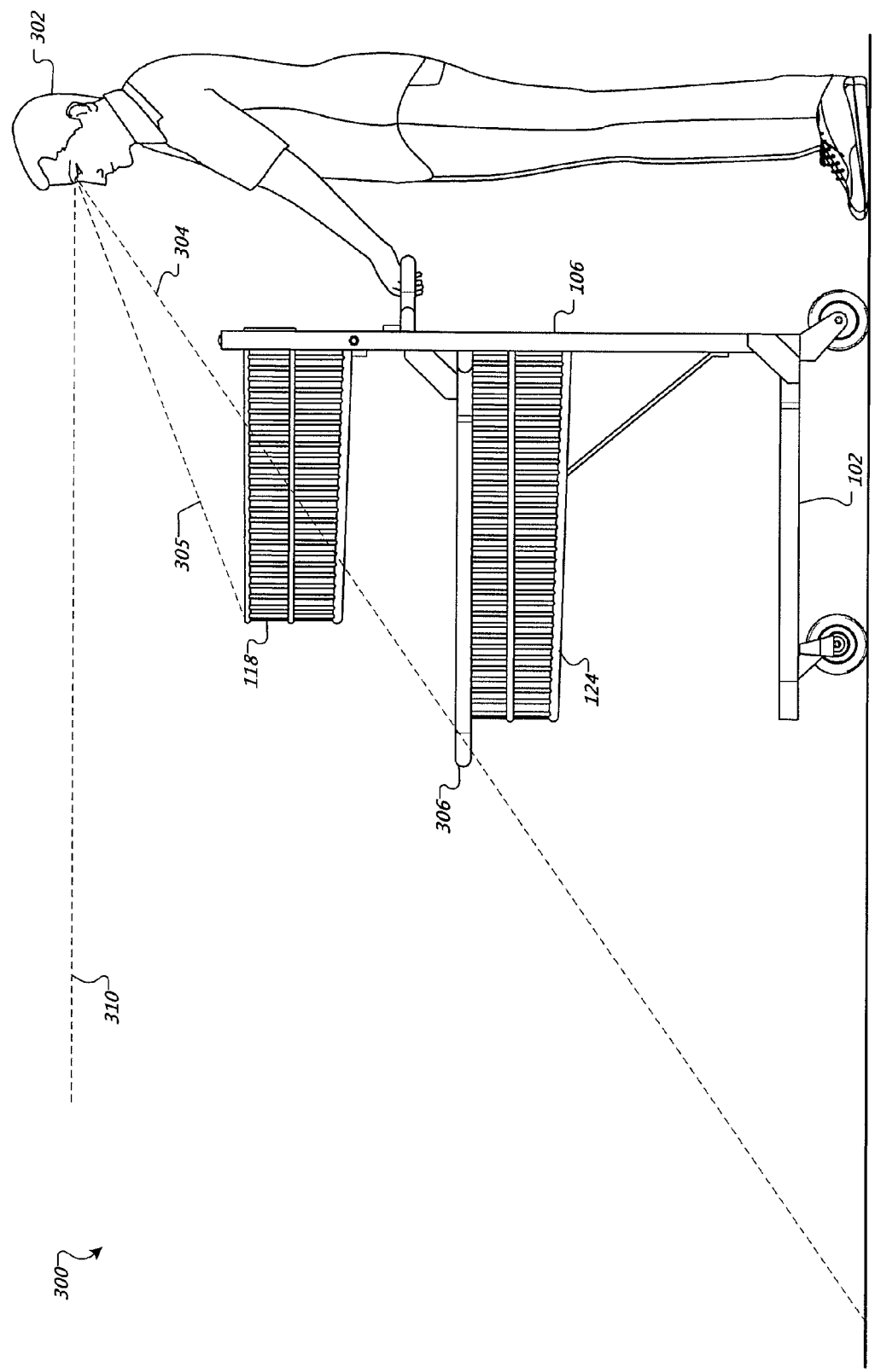
FIG. 3 is another side view of the stocking cart apparatus of FIG. 1.

FIGS. 1-3 show, respectively, perspective, side, and schematic views of certain embodiments of a multi-tier pull path stocking cart 100 having baskets attached to the upper and middle portions of the cart. The length of the upper basket relative to the middle basket may facilitate transporting goods by, for example, improving a user's line of sight, reducing blind spots near the front of the cart, and/or improving a user's access to the middle basket.

Referring to FIG. 1, a perspective view of an embodiment of a stocking cart apparatus 100 is shown. The stocking cart 100 includes three tiers of storage space that may be used to store and transfer materials or goods between various locations. The stocking cart 100 includes a base 102 mounted on wheels 104. The wheels 104 are optionally caster wheel assemblies placed at the four corners of the base 102. The base 102 includes a lower frame having a longitudinal axis that extends from the rear of the cart 100 to the front of the cart 100, a front frame member perpendicular to the longitudinal axis, and two longitudinal side frame members extending rearwardly from the front frame member. In some embodiments, the stocking cart 100 may include three wheel assemblies, with two wheel assemblies positioned rearwardly and one positioned in the middle of the front frame member.

In some embodiments, the base 102 and a support frame 106 may be fabricated as a single piece. For example, the base 102 and support frame 106 may be formed from a single pipe member bent to the depicted configuration. In other embodiments, the base 102 and support frame 106 may be integrally molded from plastic resin. As illustrated, the base 102 includes a U-shaped, substantially rigid tubing structure for supporting a carrying deck 108. The deck 108 provides a flat support surface for housing a shelving structure (e.g., a grate) capable of receiving both boxed and loose goods.

The support frame 106 includes side frame bars 112 connectively coupled with horizontal bars 114. In particular, the side frame bars 112 receive and support the end portions of each horizontal bar 114. The support frame 106 generally supports one or more tiers of baskets, containers, or decking on horizontal bars 114.

The stocking cart 100 includes an upper tier 116 that comprises an upper basket 118. The upper basket 118 includes a rear portion 132 secured to a horizontal bar 114, so that it protrudes forward from support frame 106. Similarly, the stocking cart 100 includes a middle tier 122 that comprises a middle basket 124 secured to another horizontal bar 114 on support frame 106. The cart 100 also includes a bottom tier 138 including the base 102 and a deck 108.

The overall height of the stocking cart 100 is the vertical distance from the bottom of the wheels 104 to the top of the support frame 106. The length of the cart 100 is the distance from the rear of the handle 125 to the most distant edge of the cart, which, in an illustrative embodiment, is indicated by the edge 130 of the middle basket 124. The width of the cart is the horizontal distance separating the outermost edges of the base 102 as viewed from the rear of the cart. The overall cart dimensions may be selected as to allow the cart to navigate narrow aisles, in addition to providing other benefits.

Like the cart 100, each basket 118 and 124 has an associated width, length, and height. The basket widths (the distance between the outermost edges of the rear of a basket) and lengths (distance from the outside edge of the rear wall of a basket to the outer edge of the front wall of a basket) discussed below may provide certain advantages. For example, in some embodiments, the upper basket 118 is shorter than the middle basket 124, which provides improved access to the middle basket 124 and improves a user's line of sight to the distal end of the cart 100. The basket heights—the vertical distance between the underside of the rear wall of a basket and a basket's upper edge—specified below may prevent goods inside the basket from falling out.

In an illustrative embodiment, the length of the upper basket 118 is between roughly 20 and 25 inches, which may allow the upper basket 118 to contain both loose goods and small boxed goods. In another example, the length of the upper basket 118 is between about 21 and 23 inches. In some embodiments, the length of the upper basket 118 is about 22 inches.

The width of the upper basket may range from approximately 26 to 30 inches to accommodate boxed or loose goods. In some embodiments, the upper basket 118 width is about 27 to 29 inches. In other embodiments, the width of the upper basket 118 is about 28 inches.

In addition, the height of the upper basket 118 ranges from about 6 to 10 inches. Having an upper basket 118 with a height in this range may prevent goods from falling over the lip of the upper basket 118. In some embodiments, the height of the upper basket 118 is about 6 to 8 inches. In other embodiments, the height of the upper basket is about 7 inches.

The ratio of the width of the upper basket 118 relative to its height ranges from about 2:1 to 6:1, which helps to accommodate large items. In some embodiments, the ratio of the width of the upper basket 118 relative to its height ranges from about 3:1 to 5:1. In other implementations, the width-to-height ratio of the upper basket 118 is roughly 4:1.

In some implementations, the volume of the upper basket 118 ranges from about 4000 to 5000 cubic inches. This range of volumes may accommodate both boxed goods and smaller loose items. In other embodiments, the volume of the upper basket 118 ranges from about 4600 to 4700 cubic inches. In yet other embodiments, the volume of the upper basket 118 is about 4660 cubic inches.

The length, width, height, and width-to-height ratio of the middle basket 124 may also provide ergonomic advantages. For example, middle baskets having the following dimensions ease user access to the middle basket.

Similar to the top basket 118 described above, the width of the middle basket 124 ranges from about 26 to 30 inches to accommodate large, unwieldy items. In some embodiments, the middle basket 124 has a width of about 27 to 29 inches. In other embodiments the width of the middle basket 124 is about 28 inches.

In certain implementations, the height of the middle basket 124 ranges from roughly 6 to 10 inches. In some embodiments, the height of the middle basket 124 ranges from about 6 to 8 inches. In other implementations, the height of the middle basket 124 is approximately 7 inches.

In some implementations, the length of the middle basket 124 ranges from about 27 to about 31 inches. In certain embodiments, the length of the middle basket 124 ranges from about 28 to 30 inches. In other embodiments, the length of the middle basket is about 29 inches.

In some embodiments, the ratio of the width of the middle basket 124 relative to its height ranges from about 2:1 to 6:1. Middle baskets having width-to-height ratios in this range may be better suited to carry large, bulky items. In some embodiments, the ratio of the width of the middle basket 124 relative to its height ranges from about 3:1 to 5:1. In other implementations, the width-to-height ratio of the middle basket 124 is roughly 4:1.

In some implementations, the volume of the middle basket 124 ranges from about 5800 to 6300 cubic inches. This range of volumes may permit the middle basket 124 to carry a wide range of goods. In other embodiments, the volume of the middle basket 124 ranges from about 6100 to 6200 cubic inches. In yet other embodiments, the volume of the middle basket 124 is about 6160 cubic inches.

Certain ratios of the volume of the upper basket 118 relative to the volume of the middle basket 124 may allow the baskets to carry goods of similar size. For example, in some implementations, the ratio of the volume of the upper basket compared to the lower basket is between roughly 66 and 86%. In other embodiments, this ratio falls between roughly 70 and 80%. In some implementations, the ratio is roughly 76%.

Referring to FIG. 3, the ratio of the length of the upper basket 118 relative to the middle basket 124 provides a user 302 with an improved line of sight 304 to the ground immediately in front the cart 100, which may make the cart 100 easier to steer. In some embodiments, provision of a shorter upper basket 118 enables the user 302 to view beyond the upper basket 118 (as indicated by line of sight 305) to the ground closer to the front of the cart. In some embodiments, the material of the basket can increase the visibility of lower tiers. For example, a basket fabricated from a mesh material generally allows users to see through the mesh of the upper basket 118 to view the middle basket 124 and possibly the distal end 306 of the cart 100 (as indicated by line of sight 304). In addition, these ratios may provide greater access to the middle basket 124. For example, an upper basket 118 that is shorter than the middle basket 124 may provide unfettered access to parts of the middle basket 124.

In some embodiments, the upper basket 118 is between about 65 and 85% of the length of the middle basket 124. In other embodiments, the upper basket 118 is between about 70 and 80% of the length of the middle basket 124. In some implementations, the upper basket 118 is roughly 76% of the length of the middle basket 124.

Depending on the relative lengths of the baskets 118 and 124 and the height of the user 302, the angle of the line of sight 304 can range from about 10 degrees above a horizontal 310 to about 50 degrees below the horizontal 310. Accordingly, the user 302 may focus on the few degrees (e.g., about 35 to 45 degrees below the horizontal 310) to visualize or actually ascertain the location of the distal end 306 of the cart 100. In some embodiments, the line of sight range is from approximately 10 degrees above the horizontal 310 to about 35 degrees below the horizontal 310.

In some embodiments, the overall length, width, and height of the cart fall within ranges, and have ratios relative to other cart dimensions, that may make the cart easier and safer to use. Similarly, selected distances between cart components may also make the cart more user-friendly. For example, certain overall cart heights may allow a user to remove items from the cart without excessive bending or reaching. Specified cart lengths and widths may permit the cart to handle goods having a variety of sizes and shapes. Certain distances between components may also facilitate loading and emptying the cart, in addition to allowing the cart to hold goods having odd shapes and sizes.

In one example, the cart 100 ranges from approximately 45 to 55 inches in height. Similarly, in other implementations, the height of the cart 100 ranges from about 47 to 53 inches. In some embodiments, the height of the cart 100 is approximately 51 inches.

In some implementations, the length of the cart 100 is between about 35 and 45 inches, which may allow the cart to carry long items. In other embodiments, the length of the cart 100 is between about 37 and 42 inches. In some implementations, the length of the cart 100 is about 41 inches.

The width of the cart 100, in some embodiments, ranges from about 26 to 30 inches, which allows a user to maneuver the cart down narrow aisles. In some implementations, the width of the cart 100 ranges from about 27 to 29 inches. In other embodiments, the cart's width is about 28 inches.

In some embodiments, the top of the middle basket 124 ranges from about 22 to 30 inches above the top of the base member 102. This range allows the cart 100 to accommodate large boxed goods in the space between the base member 102 and the middle basket 124. In other implementations, the top of the middle basket 124 is approximately 24 to 26 inches above the top of the base member 102. In yet other embodiments, the top of the middle basket is about 25 inches higher than the top of the base member 102.

Similarly, the vertical distance between the top of the upper basket 118 and the top of the middle basket 124 ranges from 13 to 18 inches to accommodate items stored in middle basket 124. In one embodiment, the vertical distance between the top of the upper basket 118 and the top of the middle basket 124 ranges from 14 to 17 inches. In other implementations, this vertical distance is about 16 inches.

In some embodiments, the ratio of the distance from the top of the middle basket 124 to an upper edge of the upper basket 118 to the distance from the base member 102 to an upper edge of the middle basket 124 is about 60 to 70%. In other embodiments, the ratio of the distance from the top of the middle basket 124 to an upper edge of the upper basket 118 to the distance from the base member 102 to an upper edge of the middle basket 124 is about 63 to 67%. In other implementations, this ratio is about 65%.

In some embodiments, the vertical distance between the ground and an upper edge of the upper basket 118 is approximately 45 to 50 inches. In other embodiments, the vertical distance between the ground and an upper edge of the upper basket 118 is between about 47 to 49 inches. In some implementations, this distance is roughly 48 inches.

In some embodiments, the vertical distance between the ground and an upper edge of the middle basket 124 is approximately 25 to 35 inches. In other embodiments, the vertical distance between the ground and an upper edge of the middle basket 124 is between about 28 to 33 inches. In some implementations, this distance is roughly 32 inches.

In some implementations, the ratio between the height of an upper edge of the middle basket 124 and the height of an upper edge of the upper basket 118 is between about 60 and 70%. In other implementations, the ratio between the height of an upper edge of the middle basket 124 and the height of an upper edge of the upper basket 118 is between roughly 65 and 68%. In other embodiments, the ratio between the height of an upper edge of the middle basket 124 and the height of an upper edge of the upper basket 118 is roughly 66%.

In some implementations, the ratio of the cart's overall length to its overall height is approximately 75 to 85%. In other embodiments, the cart's length-to-height ratio ranges from about 77 to 83%. In other implementations, the length-to-height ratio of the cart is roughly 80%.

In certain embodiments, the width-to-height ratio of the cart is in the range 45 to 60%. In some implementations, the width-to-height ratio of the cart is about 50 to 60%. In yet other implementations, cart's width-to-height ratio is about 55%.

To facilitate access to the middle basket, in some implementations, the upper basket 118 pivots upward. In some embodiments, the pivot is a hinge and the upper basket 118 is configured to rotate upward around the hinge in a clockwise direction. Moving the basket about a hinge is performed by grasping the basket 118 at an end or side point and pulling the basket 118 slightly upward to a desired angle. For example, the upper tier 118 rotates upward to provide easy access to goods stored in a lower tier of the stocking cart 100. Accordingly, the hinged cart may provide the benefit of not having to maneuver around the hingeable basket to view or access stored goods.

The hinged upper basket 118 provides an ergonomic alternative to strenuous bending movements when reaching into the rear of a deep basket and thus can maximize worker safety, speed, and efficiency. For example, when a worker fills the middle basket 124 with stock, the upper basket 118 can be rotated upward to allow full access to the middle basket 124. Upon finishing the stocking of the middle basket 124, the worker moves the upper basket 118 into a position parallel with the middle basket 124 and continues to place stock into the next basket. In a similar fashion, the worker unloads the stock by first emptying the upper basket 118 and then swinging the upper basket 118 upward to provide easy access to the middle basket 124. The user then empties the middle basket 124 without having to bend, stretch, or otherwise strain to view or reach the contents of the middle basket 124.

Provision of a hingeable upper basket 118 allows a user to empty the stocking cart 100 more efficiently since easier access to the stored stock is generally provided when the upper basket 118 is lifted. For example, the upper basket 118 includes a hinge that allows the basket 118 to swing upward to an angle 90 degrees from its downward position to facilitate access to the upper basket 118 or to a lower basket. In other implementations, the upper basket 118 may move upwardly to an angle 45 degrees from its downward-most position. Namely, a worker may be able to angle the upper basket 118 at 45 degrees, for example, such that the contents of the upper basket 118 are within a shorter reach to the worker when stocking from cart 100 to a shelf. In some implementations, the upper basket 118 may travel upward to angle of about 28 degrees. Some embodiments of the illustrative cart include a hinge mechanism that allows the upper basket 118 to rotate upward to a final angle between about 28 and 45 degrees. In other embodiments, the upper basket 118 may pivot upward to angle between about 45 and 77 degrees. In yet other implementations, the upper basket 118 rotates upward to an angle between about 77 and 90 degrees. The angled basket and shorter reach to the goods may be beneficial when stocking shelves above eye level, for example.

The upper basket 118 may be equipped with a dual pin hinge or spring loaded locking mechanism that secures the basket in place when it is in a raised position. A spring loaded pin (not shown) may be deployed through the frame member so as to interfere with the travel of the wire basket 118 about the hinge bolt 203, thereby securing the basket 118 in place. Alternatively, dual hinge pins may cooperate with slotted flanges (not shown) deployed on the base of the upper basket 118 to permit the basket 118 to be locked into place by raising the front end of the basket 118 and then sliding the basket 118 downward such that the slot travels along the pins and thereby locks the basket 118 into the raised position.

Figure 4:
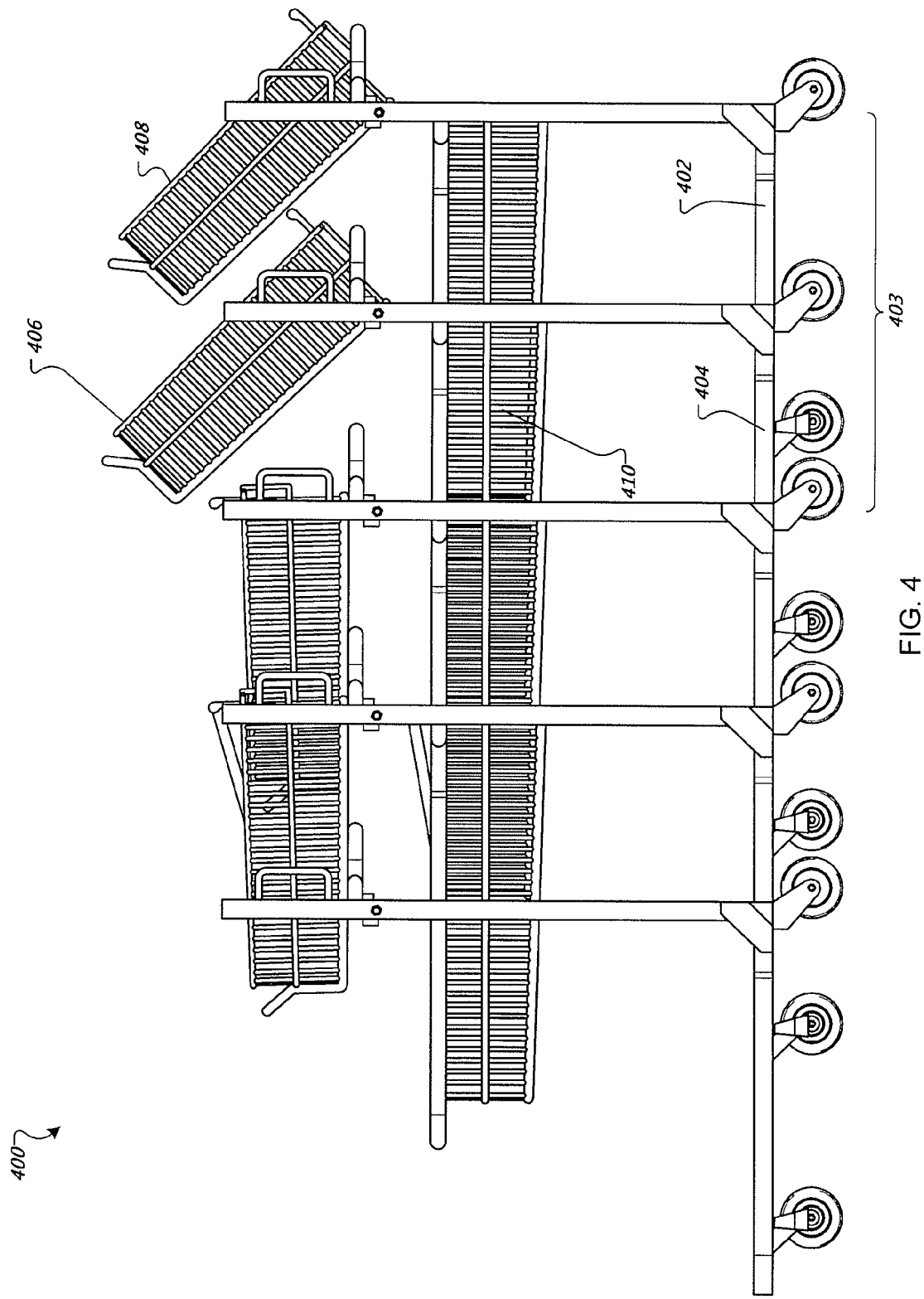
FIG. 4 is a perspective view of several nested stocking carts.

In general, two or more stocking carts 400 can be nested together as illustrated in FIG. 4. A rear cart 402 is pushed into the rear of a forward cart 404 such that the degree of nestability is at least about 50 percent (as measured by the fraction of a cart's length that is nested into another cart). In particular, when cart 402 is nested with cart 404, the entire length from the rear end of cart 402 to the front end of cart 404 is about half of the overall length of one cart 402 or 404. As an example, a first cart length and a second cart length are each about 40 inches in a standalone setup. If the first and second carts are nested, the total nested cart length 403 is still about 40 inches (i.e., 50 percent of the combined cart lengths). In some embodiments, the nested cart length ranges from about 45-55%. In other embodiments, the nested cart length ranges from about 47-53%. In yet other embodiments the nested cart length is about 50%.

In some embodiments, the cart 402 nests within similar shopping carts (e.g., cart 404) regardless of whether the upper basket 406 and 408 is in a raised or lowered position. The illustrated shorter length of the upper basket 406 in relation to the middle basket 410 may provide the benefit of nesting the carts without moving the baskets 406 or 408 to accommodate receiving another cart. In particular, the carts may be nested without requiring the front end of one basket to extend into the rear end of another basket.

In one embodiment, the stocking cart 100 includes a relatively narrow footprint that may provide for nesting the cart 100 with several other carts. This may be especially useful when navigating in tight areas and during storage of the cart 100. Nesting carts 400 together as illustrated in FIG. 4 may conserve storage space in a crowded stock room, for example.

Referring again to FIG. 1, baskets 118 and 124 are illustrated with a conventional wire construction. Fashioning the baskets 118 or 124 out of a mesh material provides an added benefit of steering accurately by peering through the upper basket 118 to a lower tier or ground level. Although only two baskets are depicted in FIG. 1, more baskets may be provided.

In some embodiments, the support frame 106 may include one or more attached handles 125 for maneuvering the stocking cart 100 during use. The handle 125 is placed at the rear of the cart 100. The handle 125 may be a single handle allowing one hand control. For example, the handle 125 may be placed to provide a user with a comfortable push or pull motion independent of the weight of the stocking cart 100. In particular, the handle 125 may be strategically placed at the lateral center of gravity of the stocking cart, such that the user can easily push or pull the cart. In some embodiments, the handle 125 may be moveable along support frame 106. For example, the handle 125 may allow for individual height comfort and specific user handling of the cart 100.

Referring to FIG. 2, a side view of the stocking cart apparatus 100 is depicted. In one embodiment, the stocking cart 100 is used to transfer materials from a stock room to a merchandise floor. In particular, a user may navigate the stocking cart 100 to a first location (e.g., a stock room) and fill the cart 100 wholly or partially with boxes, merchandise, or other goods and then navigate the stocking cart 100 to one or more other locations (e.g., a merchandise floor) and place the goods, as desired.

The stocking cart 100 can be used to separate different types of stock, which may help to prevent user damage to the stock. For example, heavy boxes of freight may be placed on a lower tier. Similarly, an upper tier may be used to store small or fragile goods, which prevents damage to the fragile goods from the heavy boxes. In addition, single items that are not boxed can be placed in the upper tier to facilitate easy access for stocking a few singular items, rather than stocking an entire case of items on a merchandise floor, for example.

Certain aspects of the stocking cart 100 may provide ergonomic benefits to the cart user. For example, handle 125 may be angled to reduce wrist strain experienced by a user pushing the stocking cart 100. In some embodiments, handles other than handle 125 may be added to provide ease of use of cart 100. For example, one or more vertical handles can be provided in other locations on the cart 100, such as on the top of the basket 118. As such, the vertical handle can be used to hinge the basket upward or downward. In another example, a handle is placed on the front portion 102 such that a user can manually pull or push the stocking cart 100 from the front of the cart. In yet another example, a handle is placed lower on the support frame 106, such that a user can pull or push the cart 100 from a squatted position, as is the case when stocking low shelves with material off of the deck 108.

FIG. 3 is schematic view of the stocking cart 100. The three-tier stocking cart 100 is shown with a user 302 near the proximal end 306. As described above, the stocking cart 100 includes the deck 108, the upper basket 118, and the middle basket 124. While the stocking carts depicted in FIGS. 1-3 are configured with three tiers of storage space, it should be understood that other embodiments may include more or fewer storage tiers.

In some embodiments, the stocking cart 100 may be designed to receive various styles of baskets. In addition, baskets may be appended to other baskets. For example, a smaller basket can "piggy-back" onto a larger basket. In one implementation, "piggy-backed" baskets provide more cart storage if, for example, the basket is appended to the outside edge of either basket 118 or 124, or support frame 106.

In some configurations, baskets 118 and 124 are dimensioned to receive one or more smaller containers so that stocking cart 100 may transport loose stockable goods. The containers may be removably attached by hooks, or other mechanisms, or may be placed in the baskets 118 and 124. For example, basket 118 can receive a divided bin for small items in the top of the upper basket 118.

Figure 5:
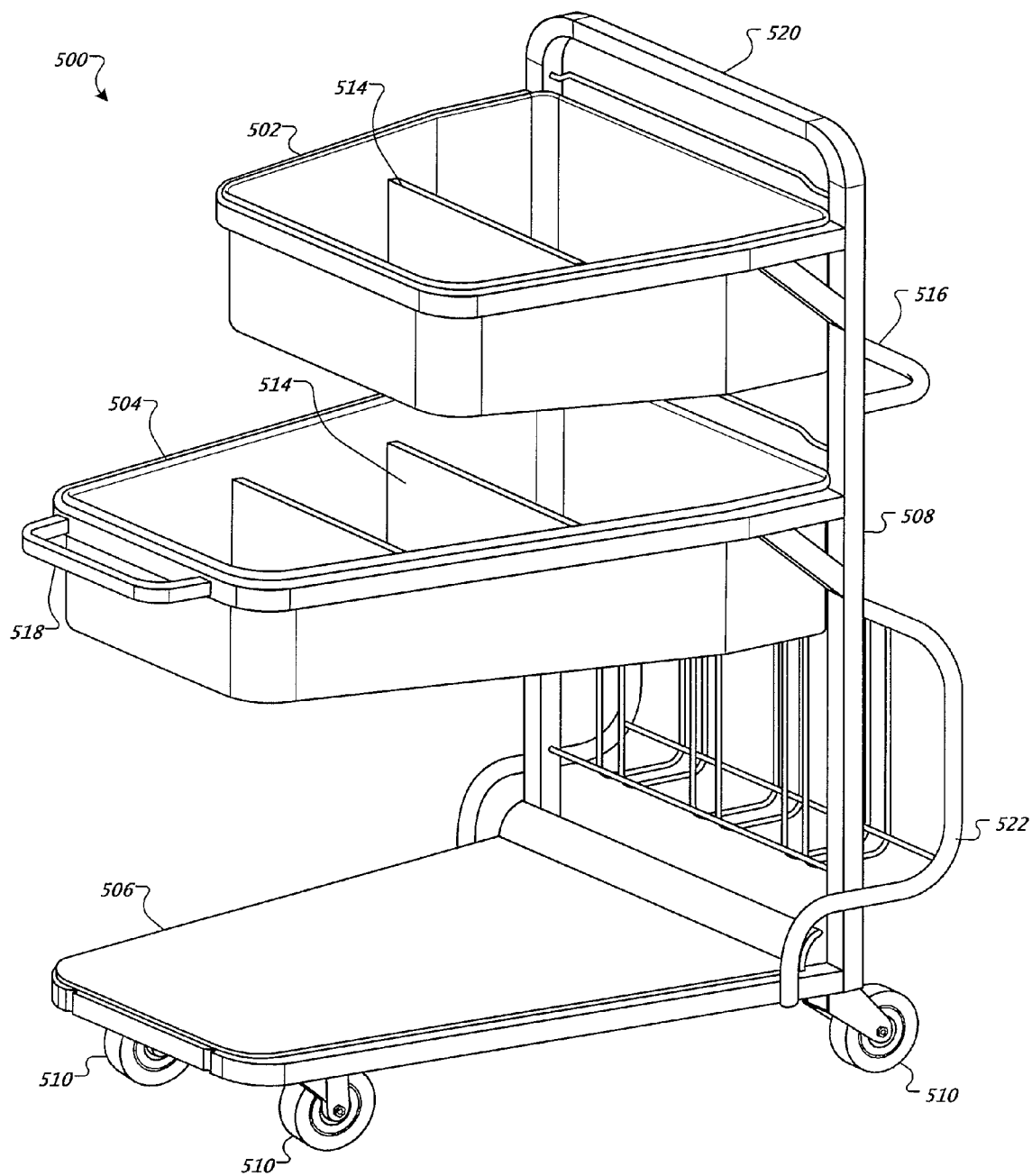
FIG. 5 is an embodiment of a stocking cart apparatus.

FIG. 5 is an embodiment of a stocking cart apparatus 500. The stocking cart 500 includes an upper basket 502, a middle basket 504, and a deck 506 mounted on a support frame 508. In this example, the baskets 502 and 504 are fabricated out of a solid material, such as a plastic resin. As such, the baskets 502 and 504 may not rust, discolor, or warp, and in some implementations, using such materials may allow for easy cleaning, providing an essentially maintenance free container.

The deck 506 is mounted on wheels 510. In one example, the wheels 510 are standard wheel assemblies placed at the four corners of the deck 506. In some embodiments, the wheels 510 include four swivel casters. In other embodiments, the wheels 510 include two swivel casters and two wheel assemblies. In yet other embodiments, the wheels 510 include silent roll, full swivel ball bearing casters that may be non-marking.

In some embodiments, baskets 502 and 504 include dividers 514 for separating goods during transport. In one example, the dividers 514 are slideably mounted to the sides of a basket, and accordingly may be movable to one or more positions within the basket. In some embodiments, the dividers 514 may vary in size over the length of the divider to account for basket widths that taper from back to front. In another example, the dividers 514 swing downward on a hinge to fold flat when a larger storage area is desired. In yet another example, the dividers 514 swing upward on a hinge, for example, when the cart 500 is nested with another cart. In some embodiments, the dividers 514 may be fixed partitions constructed as a permanent fixture in the basket. Dividers 514 may be placed in baskets 502 or 504 lengthwise, widthwise or a combination of the two to form a connecting joint to further partition the cart.

Referring to FIG. 5, a handle 516 is shown attached to the support frame 508. The handle 516 may be used to steer cart 500 during transport. The stocking cart 500 can include a plurality of attached handles for maneuvering the stocking cart 100 during use. For example, a handle 518 is illustrated at the front edge of middle basket 504. The handle 518 may, for example, be used by a worker while stocking items from the front of the cart 500. A third handle 520 is illustrated as an integrated handle in support frame 508. The handle 520 can be used to easily maneuver cart 500 when, for example, making a right or left turn down an aisle.

In some configurations, the stocking cart 500 includes a fixedly attached container 522. The container 522 is illustrated as a wire basket protruding from the middle basket 504 and deck 506. In some embodiments, the container 522 is used to store broken down boxes after removing and stocking the items in the boxes. In some embodiments, a user can store tools, scanners, or stock in holder 522.

Figure 6:
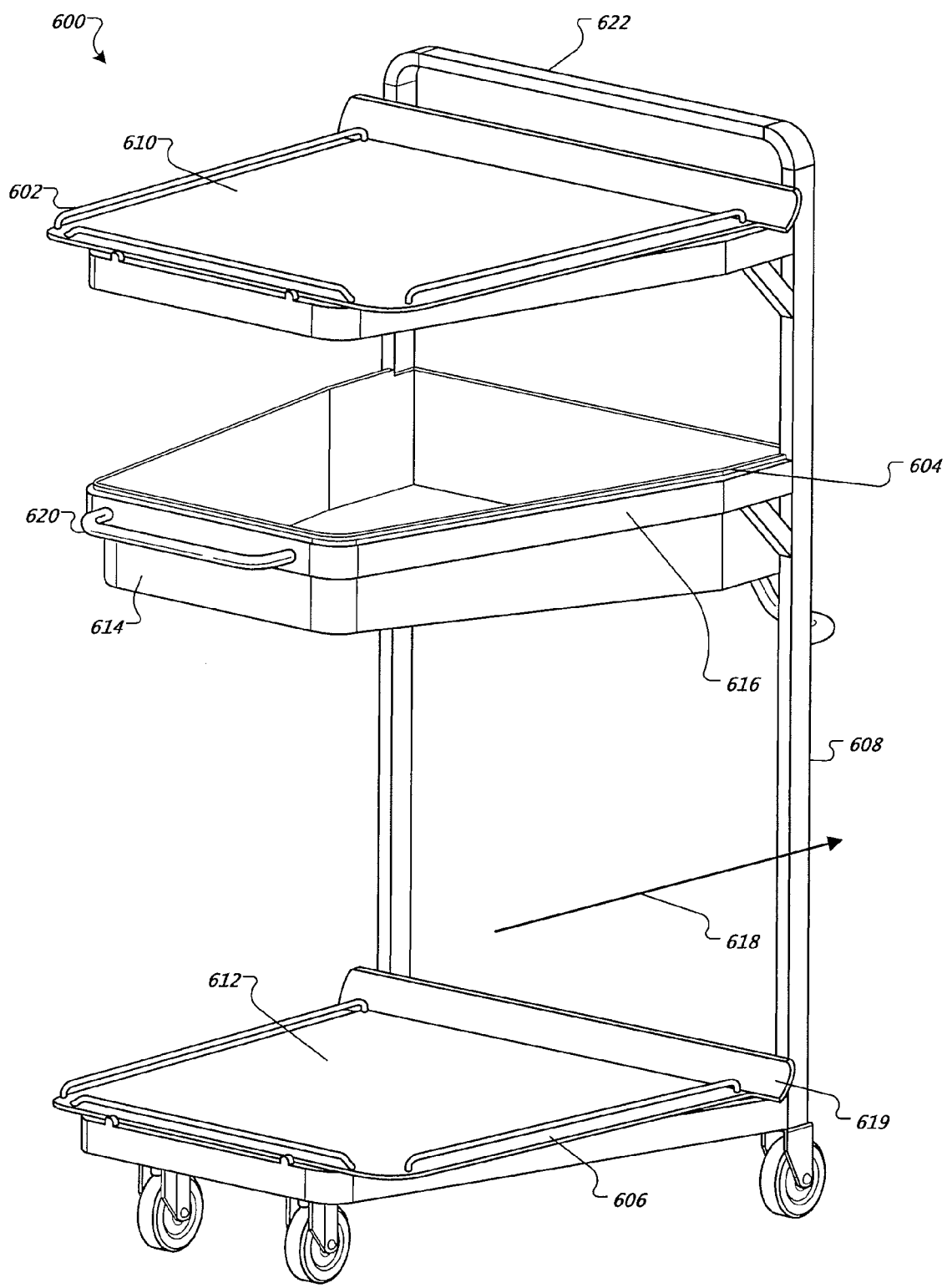
FIG. 6 is another embodiment of a stocking cart apparatus.

FIG. 6 is another embodiment of a stocking cart apparatus 600. The stocking cart 600 includes an upper tier 602, a middle tier 604, and a lower tier 606 mounted on a support frame 608. The tiers 602-606 in this example are equal in length. As illustrated, the tiers 602 and 606 include a shallow tray 610 and 612, respectively, having one or more upwardly extending rims on each of the four sides of both trays 610 and 612. For example, the height of the upwardly extending rims may range from about 0.5 to 2 inches to retain small items or to retain an edge of a box. In other embodiments, tiers 602 and 606 include substantially flat trays which can, for example, hold large stock items, such as pet food, flour sacks, or water softener salt.

The middle tier 604 includes a shallow basket 614 slideably mounted within a support assembly 616. For example, the basket 614 can be removable from the rear of the cart 600 by sliding the basket 614 in a backward motion along guide rails within support assembly 616, as indicated by arrow 618. Although only three tiers are depicted in FIG. 6, other tiers can be affixed to cart 600. For example, a tier can be inserted between middle tier 604 and lower tier 606 for receiving additional goods. In some embodiments, trays may be replaced with baskets according to user preferences.

In some embodiments, the upper tier 602 and the lower tier 606 include a cargo mat (not shown) designed to prevent boxes and other items from sliding around within the baskets. In other embodiments, an upwardly extending retainer portion 619 is installed on tier 606 to prevent boxes or goods from sliding off the back of the stocking cart 600. For a similar purpose, some configurations of stocking cart 600 include an upward extending lip provided on the front of the cart 600. In some embodiments, the retainer portion 619 or upwardly extending lip is permanently affixed.

In some embodiments of cart 600, tiers 602-606 are configured to be removable. For example, tray 610 may be full of stock and removed from cart 600 to process the stock stored on the trays. In particular, if tray 610 is used to transport new medical parts requiring an autoclaving process before use, the fully stocked tray 610 can be removed from the cart 600 and the entire tray can be placed in an autoclave machine for processing.

In some embodiments, tray 600 includes one or more handles to facilitate maneuvering. For example, a handle 622 is shown integrated into support frame 608. The handle 622 can be used to push or pull the cart 600 throughout a warehouse, stock room, or retail floor, for example. In addition, a handle 620 is shown integrated into the tier support rail assembly 616. The handle 620 can be used to push or pull cart 600 using automated equipment. For example, a cart corral device may grasp the handle 620 and automatically push the cart 600 upon receiving user input (e.g., via controls on the cart corral device).

A number of embodiments have been described. Nevertheless, it will be understood that various modifications may be made without departing from the spirit and scope of this disclosure. Accordingly, other embodiments are within the scope of the following claims.

What is claimed is:

1. A cart comprising:
a lower frame having a longitudinal axis and comprising a front frame member generally perpendicular to the longitudinal axis and two generally longitudinal side frame members extending rearwardly from the front frame member, the lower frame including a support member generally defining a surface adapted to transport goods;
at least three wheel assemblies, at least two of the wheel assemblies being coupled proximate the rearward end of the side frame members and at least one of the wheel assemblies being coupled proximate the front frame member;
a rear frame member extending upwardly from the side frame members, the rear frame member including two generally vertical side frame members and a handle member substantially spanning a distance extending between the vertical side frame members;
a middle storage tier generally parallel to and positioned above the lower frame, the middle tier extending forwardly from the rear frame, the middle storage tier further including a structure that defines a generally rectangular, open-top storage volume having a longitudinal length, a width, and a height;
an upper storage tier generally parallel to and positioned above the middle storage tier, the upper storage tier extending forwardly from the rear frame, the upper storage tier further including a structure that defines a generally rectangular, open-top storage volume having a longitudinal length, a width, and a height, wherein the length of the upper storage tier is at least about half but less than about 75% of the length of the middle storage tier,
wherein the upper storage tier is hingedly moveable from a first operative position in which the tier is generally parallel to the middle storage tier to a second operative position in which the forward end of the upper storage tier is hinged to an angle between about 28 and 45 degrees or between about 45 and 77 degrees from the first operative position; and a locking mechanism cooperable with the upper storage tier, the locking mechanism securing the upper storage tier in the second operative position.

2. The cart of claim 1, wherein the front ends of the side frame members are positioned more closely together than the rear ends of the side frame members such that the cart may be placed in a nested position relative to another cart having the same construction, wherein in said nested position the front frame member of one cart is positioned between the side frame members of another cart.

3. The cart of claim 1, wherein a volume of the upper storage tier is approximately 4660 cubic inches.

4. The cart of claim 1, wherein a volume of the upper storage tier is approximately 60 to 80% of the volume of the middle storage tier.

5. The cart of claim 1, wherein a ratio of the overall length to the overall height of the cart is about 4:5.

6. The cart of claim 1, wherein a ratio of the height of an upper edge of the middle storage tier to the height of an upper edge of the upper storage tier is about 2:3.

7. The cart of claim 5, wherein a ratio of the overall width to the overall height of the cart is about 3:5.

8. The cart of claim 2, wherein the upper storage tiers of the carts are hingedly moveable from a first operative position in which the tier is generally parallel to the middle storage tier to a second operative position in which the forward end of the upper storage is in a raised position, and wherein the carts may be nested when the upper storage tiers are each in the second operative position.

9. The cart of claim 1, wherein a ratio of the length of the middle tier storage volume length to the middle tier storage volume height is about 4.

10. The cart of claim 9, wherein a ratio of the length of the upper tier storage volume length to the upper tier storage volume height is about 3.

11. The cart of claim 1, wherein the lower frame includes walls defining a storage volume.

12. The cart of claim 2, wherein a degree of nestability of the cart is at least about 50%.

13. A method of using the cart of claim 1, comprising:
positioning the cart in an aisle of a warehousing area;
stocking the cart with goods from shelves located in an aisle;
positioning the stocked cart in an aisle of a retail environment, the retail environment being juxtaposed with the warehousing area; and
moving the goods from the cart to shelves of the retail environment, wherein moving the goods comprising the step of removing goods from the upper storage tier and then raising the upper storage tier to the second operative position;
wherein the goods are transported directly from the warehousing area to the retail environment with the use of a single cart.

14. A method of using the cart of claim 2, comprising:
positioning the cart in an aisle of a warehousing area;
stocking the cart with goods from shelves located in an aisle;
positioning the stocked cart in an aisle of a retail environment, the retail environment being juxtaposed with the warehousing area; and
moving the goods from the cart to shelves of the retail environment; and
storing the cart by nesting it with another cart of the same construction;
wherein the goods are transported directly from the warehousing area to the retail environment with the use of a single cart.

15. The cart of claim 1, wherein the middle storage tier and upper storage tier comprise wire baskets, thereby further improving user visibility and cart maneuverability.

16. The cart of claim 1, wherein a ratio of the distance from the upper edge of the middle tier storage volume to an upper edge of the upper storage tier to the distance from the lower frame support member to an upper edge of the middle storage tier is about 13:20.

* * * * *